United States Patent Office

3,400,178
Patented Sept. 3, 1968

3,400,178
O-ISOPROPYL-S-(p-TOLYL) CHLOROMETHYL-
PHOSPHONODITHIOATE
Ralph B. Fearing, Hammond, Ind., Edward N. Walsh, Chicago Heights, Ill., and John Bruce McBain, Campbell, Calif., assignors to Stauffer Chemical Company, New York, N.Y., a corporation of Delaware
No Drawing. Continuation-in-part of application Ser. No. 172,851, Feb. 13, 1962. This application Nov. 5, 1964, Ser. No. 409,286
1 Claim. (Cl. 260—961)

ABSTRACT OF THE DISCLOSURE

Compounds of the formula:

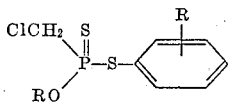

wherein R is n-propyl or isopropyl, and $R^1$ is hydrogen or lower alkyl of one to four carbons.

---

This application is a continuation-in-part of U.S. patent application Ser. No. 172,851, filed Feb. 3, 1962, now abandoned.

This invention is directed to certain novel phosphorus-containing compounds, and their use as pest control agents.

The novel compounds are the alkylphenyl thio ester derivatives of phosphonothiolothionic acid and may be represented by the formula:

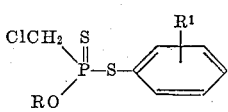

wherein R is a lower alkyl selected from the group consisting of n-propyl and isopropyl, preferably isopropyl, and $R^1$ is selected from the group consisting of hydrogen and lower alkyl of from one to four carbons, but methyl is preferred.

The overall reaction for preparing the compounds of the invention may be expressed by the following equation:

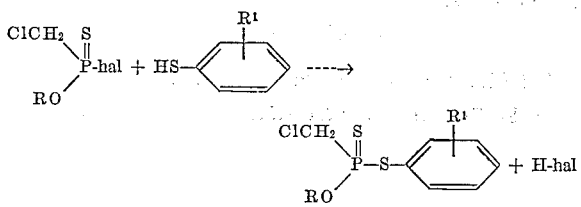

wherein R and $R^1$ are as defined hereinbefore; and "hal" is a halogen atom, preferably chlorine. The reaction is preferably carried out in the presence of an organic solvent such as benzene, dioxane, toluene, xylene, and the like, and a hydrogen halide acceptor such as triethylamine, pyridine, and the like, while the temperature is preferably maintained between 30° C. and 80° C. The hydrogen halide acceptor serves to bind the halogen acid side product and thereby prevents its reaction with the phosphonate product. Under the preferred reaction conditions using an organic solvent and hydrogen halide acceptor, the present process is efficient and offers near-stoichiometric yields of product, normally between 80% and 96% of theoretical.

The following specific examples illustrate the method of preparing the novel compounds, but should not be construed as unduly limiting the broader aspects of the invention.

Example 1

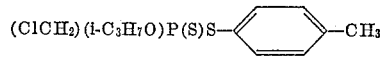

Fifty cc. of benzene, 14.9 grams of p-toluenethiol (0.12 mol) and 25 grams of O-isopropyl chloromethylphosphonochloridothioate (0.12 mol) were replaced in a reaction flask to which was slowly added (i.e., dropwise) a solution of 12.2 grams of triethylamine (0.12 mol) in 25 cc. of benzene. After the addition of the triethylamine, accomplished while the contents of the flask were maintained at 30–35° C., the reaction mixture was heated for an additional hour at 45° C. The reaction product was washed twice with cold water, once with a 10% sodium carbonate solution, and again twice with cold water. The product was then dried and concentrated to 60° C. at 1 mm. Hg and found to consist of 33 grams (93% yield) of O-isopropyl-S-(p-tolyl) chloromethylphosphonodithioate, having an index of refraction $N_D^{25}=1.5802$, and analysis of 10.2% P, 22.4% S, and 12.7% Cl compared to theoretical calculated values of 10.5% P, 21.7% S, and 12.1% Cl.

Example 2

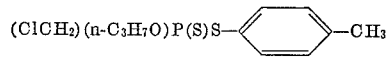

Fifty cc. of benzene, 14.9 grams of p-toluenethiol (0.12 mol) and 25.0 grams of O-(n-propyl) chloromethylphosphonochloridothioate (0.12 mol) were placed in a reaction flask to which was slowly added a solution of 12.2 grams (0.12 mol) of triethylamine in 25 cc. of benzene. After the addition of the triethylamine, accomplished while the contents of the flask were maintained at 30–35° C., the reaction mixture was heated for an additional hour at 45° C. The reaction product was then washed twice with cold water, once with a 10% sodium carbonate solution, and again twice with cold water. The product was then dried and concentrated to 60° C. at 1 mm. Hg and found to consist of 34 grams (96% yield) of O-(n-propyl)-S-(p-tolyl) chloromethylphosphonodithioate having an index of refraction $N_D^{25}=1.5682$, and analysis of 9.8% P, 22.8% S, and 12.5% Cl compared to the theoretical calculated values of 10.5% P, 21.7% S, and 12.1% Cl.

Example 3

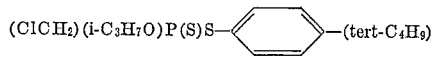

Twenty-five cc. of benzene, 13.0 grams of t-butylphenylmercaptan (.0785 mol) and 16.3 grams of O-isopropyl chloromethylphosphonochloridothioate (.0785 mol) were placed in a reaction flask to which was slowly added (i.e., dropwise) a solution of 8.5 grams of triethylamine in 10 cc. of benzene. After the addition of the triethylamine, accomplished while the contents of the flask were maintained at 40° C., the reaction mixture was heated for an additional three hours while maintaining the temperature between 50 and 55° C. The reaction product was washed twice with cold water, once with a 10% sodium carbonate solution, and again twice with cold water. The product was then dried and concentrated to 60° C. at 1 mm. Hg and found to consist of O-isopropyl-S-(p-tert butylphenyl) chloromethylphosphonodithioate (84% yield) having an index of refraction $N_D^{25}=1.5642$, and analysis of 9.6% P, 18.7% S, and 10.5% Cl compared to the theoretical calculated values of 9.2% P, 19.0% S, and 10.5% Cl.

The compounds of the present invention have been found to be surprisingly more active as pesticides than related compounds containing methoxy and ethoxy radicals attached directly to the phosphorus (see, e.g., German Patent 1,138,049, published Oct. 18, 1962). As a general proposition, the phosphorus-containing pesticides of the prior art have been found to have higher pesticidal activity where the ester groups are methoxy and ethoxy. Where propoxy or longer chain groups are substituted, activity usually falls off dramatically. Thus, it was quite unexpected that the propyl compounds of the present invention would prove to be as good as their methyl or ethyl homologs, much less superior. Although active as pesticides generally, the compounds of the invention are exceptionally effective for controlling caterpillars such as the salt-marsh caterpillar (*Estigmene acrea*) and the housefly (*Musca domestica*) while having relatively low mammalian toxicity when compared to known compounds having activity of about the same magnitude.

Pesticidal activity for the novel phosphorus containing compounds of the present invention is shown in Table I wherein the percentage kill among the pest species is reported for a specified quantity of candidate compound, expressed in micrograms ($\mu$g—herein termed the bioassay test), or for a percentage concentration of aqueous dispersion (hereinafter termed the screening test). A slanted line is used to separate the percentage kill for the pest species shown on the left from the percentage concentration (screening) or total quantity (bioassay) shown on the right. When used herein the term "pest" is intended in the restricted sense generally recognized in the art as applying to the lower forms of life customarily controlled by chemical means and excluding the higher animals, the vertebrates, e.g., rodents, birds, and larger forms which are more commonly controlled by mechanical means such as traps. It will be apparent to one skilled in the art that the toxic activity of the new compounds with various pest species is indicative of activity with species and orders not shown.

In Table I the various pest species are assigned the following numbers:

1. Housefly—*Musca domestica* (Linn.)
2. American cockroach—*Periplaneta americana* (Linn.)
3. Salt-marsh caterpillar—*Estigmene acrea* (Drury)
4. Spotted milkweed bug—*Oncopeltus fasciatus* (Dallas)

TABLE I.—PESTICIDAL ACTIVITY

| Compound (example No.) | 1 Percent kill/ $\mu$g. | 2 Percent kill/ percent conc. | 3 Percent kill/ percent conc. | 4 Percent kill/ percent conc. |
|---|---|---|---|---|
| 1 | 50/5 | 50/0.03 | 50/0.003 | 50/0.01 |
| 2 | 50/10 | 100/0.1 | 50/0.01 | 60/0.1 |
| 3 | 50/20 | | 50/0.05 | |

In the screening tests for insect species numbered 1, 2, and 4 in Table I, from ten to twenty-five insects were caged in cardboard mailing tubes 3⅛″ in diameter and 2⅝″ tall. The cages were supplied with cellophane bottoms and screen tops. Food and water were supplied to each cage. Dispersions of the test compounds were prepared by dissolving one half gram of the toxic material in 10 ml. of acetone. This solution was then diluted with water containing 0.0175% v./v. Sponto 221, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

The compounds showed high mortality in the screening tests and were bioassayed on house flies. In this test, a known quantity of the toxicant was placed in a confined area. The same cages were employed as for the fly screening test. A weighed amount of the toxicant was placed in Pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead flies were made forty-eight hours after initiation of the test.

Compounds which showed an $LD_{50}$ value (i.e., 50% of test species killed) at 50$\mu$g. or less on house flies, were tested for contact stomach screening on the salt-marsh caterpillar (species No. 3 in the above table). Dock leaves approximately five inches long were dipped in aqueous suspensions of the test materials for ten seconds. The leaves were then placed in one pint food containers with the stems projecting through small holes in the bottom into vials containing water. Five 8 to 10 day old salt-marsh larvae were introduced and the containers were closed with a petri dish lid. Mortality readings were taken at twenty-four and seventy-two hours. The results are shown above in Table I.

Although the above tests were accomplished with aqueous dispersions, the toxic compounds can also be used commercially in the form of non-aqueous solutions, wettable powders, vapors, and dusts as best suited to the conditions of use. In many applications, fillers will be incorporated with the toxic compounds. For more specialized applications, the material may even be used in its pure, undiluted form.

The foregoing description is given for clearness of understanding only and no unnecessary limitations should be understood therefrom, as modifications will be obvious to those skilled in the art.

Having thus described the invention, what is claimed is:

1. O - isopropyl - S - (p - tolyl) chloromethylphosphonodithioate.

No references cited.

CHARLES B. PARKER, *Primary Examiner.*

A. H. SUTTO, *Assistant Examiner.*

UNITED STATES PATENT OFFICE
CERTIFICATE OF CORRECTION

Patent No. 3,400,178                                                September 3, 1968

Ralph B. Fearing et al.

It is certified that error appears in the above identified patent and that said Letters Patent are hereby corrected as shown below:

Column 1, lines 15 to 19, the right-hand portion of the formula should appear as shown below:

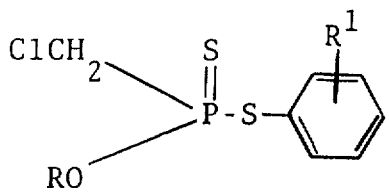

line 25, "Feb. 3, 1962" should read -- Feb. 13, 1962 --. Column 2, line 7, "replaced" should read -- placed --.

Signed and sealed this 10th day of February 1970.

(SEAL)
Attest:

EDWARD M. FLETCHER, JR.                              WILLIAM E. SCHUYLER, JR.
Attesting Officer                                              Commissioner of Patents